United States Patent
DeLuca et al.

(10) Patent No.: US 8,713,645 B2
(45) Date of Patent: Apr. 29, 2014

(54) AUTHENTICATION FOR SOCIAL NETWORKING MESSAGES

(75) Inventors: Lisa Seacat DeLuca, San Francisco, CA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/302,095

(22) Filed: Nov. 22, 2011

(65) Prior Publication Data

US 2013/0133038 A1     May 23, 2013

(51) Int. Cl.
*H04L 29/06*     (2006.01)

(52) U.S. Cl.
USPC .................................................. 726/4; 726/28

(58) Field of Classification Search
None
See application file for complete search history.

(56) References Cited

U.S. PATENT DOCUMENTS

| | | | |
|---|---|---|---|
| 7,958,192 B2 * | 6/2011 | Harik et al. ................... | 709/204 |
| 2007/0117593 A1 | 5/2007 | Izdepski | |
| 2008/0072294 A1 | 3/2008 | Chatterjee | |
| 2009/0138953 A1 | 5/2009 | Lyon | |
| 2009/0276355 A1 | 11/2009 | Willmore et al. | |
| 2010/0088187 A1 | 4/2010 | Courtney et al. | |
| 2011/0138454 A1 | 6/2011 | Mansour | |
| 2012/0227086 A1 * | 9/2012 | Dale et al. ........................ | 726/3 |
| 2013/0097683 A1 * | 4/2013 | Davis et al. ....................... | 726/7 |

OTHER PUBLICATIONS

Borisov et al. "Off-the-Record Communication, or, Why Not to Use PGP." WPES'04, Proceedings at ACM Workshop on Privacy in Electronic Society, Oct. 28, 2004, ACM, New York, NY, © 2004.
Cronovich, Ron. "Kindle vs. Nook," Amazon.com Product Review, posted on Aug. 28, 2010 (updated Jan. 2, 2011).
Cutillo et al. "Privacy Preserving Social Networking Through Decentralization," Sixth International Conference on Wireless On-Demand Network Systems and Services, 2009 (WONS 2009), pp. 145-152, Feb. 2-4, 2009, IEEE. doi: 10.1109/WONS.2009.4801860.
Facebook. "Facebook Security Discussions," date printed Aug. 8, 2011 <http://www.facebook.com/board.php?uid=31987371885&status=512>.
Lou et al. "Security, Privacy, and Accountability in Wireless Access Networks." IEEE Wireless Communications, vol. 16, No. 4, pp. 80-87, Aug. 2009, IEEE. doi: 10.1109/MWC.2009.5281259.
Zhu et al. "Provably Public Key Management Protocols for Self-organized Ad Hoc Networks," IEEE 16th International Symposium on Personal, Indoor and Mobile Radio Communications, 2005 (PIMRC 2005), vol. 4, pp. 2691-2695, Sep. 11-14, 2005, IEEE. doi: 10.1109/PIMRC.2005.1651932.
"Identifying a Social Network user Identifier Based on a User Message," Authors: Disclosed Anonymously, IP.com Prior Art Database, IPCOM000198126D, Jul. 26, 2010.

(Continued)

*Primary Examiner* — Jeffery Williams
(74) *Attorney, Agent, or Firm* — Nicholas L. Cadmus; Arthur Samodovitz

(57) ABSTRACT

A tool for verifying that a message received by a social networking service was sent by a bona fide owner of a social networking account who purportedly sent the message. The tool receives a message and it locates in the message a string that was entered into a message text field of the message. The string is compared with a registered authentication string for the bona fide owner of the account. If the string in the message matches the registered authentication string, the string is removed from the message and the message is forwarded to the social networking service. If the string in the message does not match the registered authentication string, the message is blocked from being forwarded to the social networking service.

12 Claims, 6 Drawing Sheets

(56) References Cited

OTHER PUBLICATIONS

Khalesi et al., "Towards a Trust-Based Model for Administration of Mailing Lists," Global Telecommunications Conference, 2008. IEEE GLOBECOM 2008. IEEE, pp. 1-6, Nov. 30, 2008-Dec. 4, 2008. doi: 10.1109/GLOCOM.2008.ECP.1062.

Volodarsky, Mike, "IIS 7.0 Server-Side," published Feb. 11, 2008, date printed Nov. 21, 2011 <http://mvolo.com/blogs/serverside/archive/2008/02/11/IIS-7.0-Two_2D00_Level-Authentication-with-Forms-Authentication-and-Windows-Authentication.aspx>.

* cited by examiner

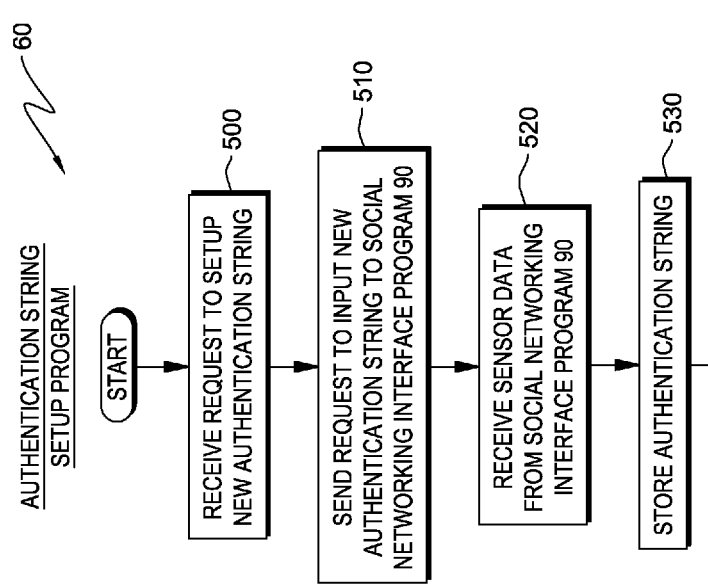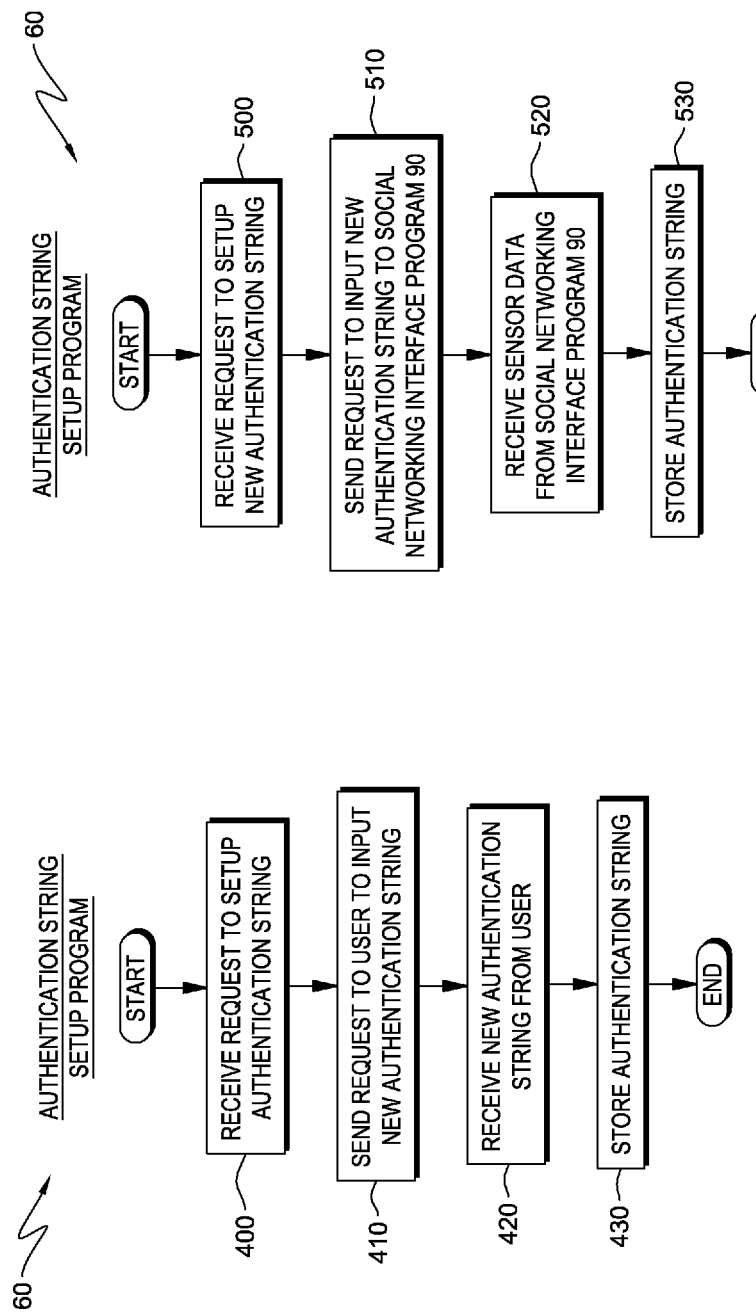

AUTHENTICATION FOR SOCIAL NETWORKING MESSAGES

TECHNICAL FIELD

The present invention relates generally to social networking and more specifically to the authentication of the sender of a social networking message.

BACKGROUND

Social networking is the interaction between people to share information, ideas, resources and interests. A popular form of social networking uses social networking services over the Internet. A social networking service allows a person to become a "user," create a profile (description of the user) for the user's web page, communicate with other users, or utilize a range of other services available through the social network service. Examples of popular social networking services are Facebook® (Registered trademark of Facebook, Inc.) social networking services and Twitter® (Registered trademark of Twitter, Inc.) social networking services.

Users of Facebook social networking services and Twitter social networking services communicate with other users of the service through "social networking messages," which are messages sent to the social networking service that can be made available to the general public, all users of the service, or to a select set of friends or followers.

For example, Facebook "friends" are pairs of Facebook users who have mutually agreed to be able to view each other's messages. A Facebook user can post a message on his or her "Facebook wall." A "Facebook wall" is a user's virtual wall displayed when a user is logged in to the Facebook service. This wall is where a user can post messages for viewing by his or her friends, and where he or she can view messages posted by his or her friends on their walls. Users can also post messages directly on a friend's wall. In another example, a Twitter user can post a "Tweet®" message which is a message posted to a Twitter account. These Tweet messages can either be public or protected. A public Tweet message can be viewed by anyone while a protected Tweet message can only be seen by approved "followers." Followers are other users of Twitter social networking service that have subscribed to a user's Twitter updates. In either of the examples above, once a social networking message is posted, it is disseminated to others.

Facebook social networking service operates on a network of servers including web servers, Memcached servers (generic high-performance, distributed memory object caching systems) and database servers. The servers receive and store data that users send when creating their profile. This data typically includes photos, lists of interests, contact information, and other information. The servers disseminate this data to other computing devices when users access the created profile. The servers communicate over the Internet with users on computing devices, such as computers or smart phones.

The servers receive messages from Facebook users attempting to communicate with others. These messages are sent from a computing device logged on to the Facebook service. The servers process and send the messages to the appropriate location (e.g., Facebook wall) for viewing by the appropriate users (e.g., friends). The messages can then be viewed on the computing device of the recipient user.

Twitter social networking service, similar to Facebook social networking service, operates on a network of servers including web servers, Memcached servers and database servers. The servers communicate over the Internet with users on computing devices, such as computers or smart phones. Twitter has a limited profile feature but is more focused on communication with the public and between users.

The servers receive Tweet messages from Twitter users wishing to share the Tweet message with others. The servers process and send the Tweet message to the Twitter profile of the sender and to the "timeline" (a list of all the Tweet messages from people a user follows) of the sender's followers.

When using a social networking service, security is a concern. Messages may be sent from someone pretending to be a specific user (spoofing) or from someone who has gained unauthorized access to a user's account (hacking). The messages may be embarrassing to the real/spoofed user. Also, users receiving these messages may respond with the release of personal information.

Authentication of a social network service user is typically limited to login authentication before access to the service is granted. A user typically enters a userID and password on the service home page to gain access. The userID and password are created when the user initially joins the service. Normally, after the initial login authentication, a user can utilize all the functionality of the social networking service.

SUMMARY

Aspects of an embodiment of the present invention disclose a method, system, and a program product for verifying that a message received by a social networking service was sent by a bona fide owner of a social networking account who purportedly sent the message. A network server computer receives the message and locates in the message a string that was entered into a message text field of the message by a person who authored the message, the string comprising first and second portions, the first portion comprising a combination of alpha numeric characters which identifies the second portion as containing purported authentication information for the bona fide owner of the account. The network server computer compares the second portion of the string in the message to a registered authentication string for the bona fide owner of the account. If the second portion of the string in the message matches the registered authentication string, the network server computer removes the string from the message and permits the message to be forwarded to the social networking service. If the second portion of the string in the message does not match the registered authentication string, the network server computer blocks the message from being forwarded to the social networking service.

BRIEF DESCRIPTION OF THE SEVERAL VIEWS OF THE DRAWINGS

FIG. 4 depicts a flowchart of the steps of an authentication string setup program for defining, establishing and storing an authentication string, in accordance with a preferred embodiment of the present invention.

FIG. 5 depicts a flowchart of the steps of another authentication string setup program for defining, establishing and storing an authentication string, in accordance with other embodiments of the present invention.

DETAILED DESCRIPTION OF THE PREFERRED EMBODIMENTS

The present invention will now be described in detail with reference to the figures.

Figure 1:
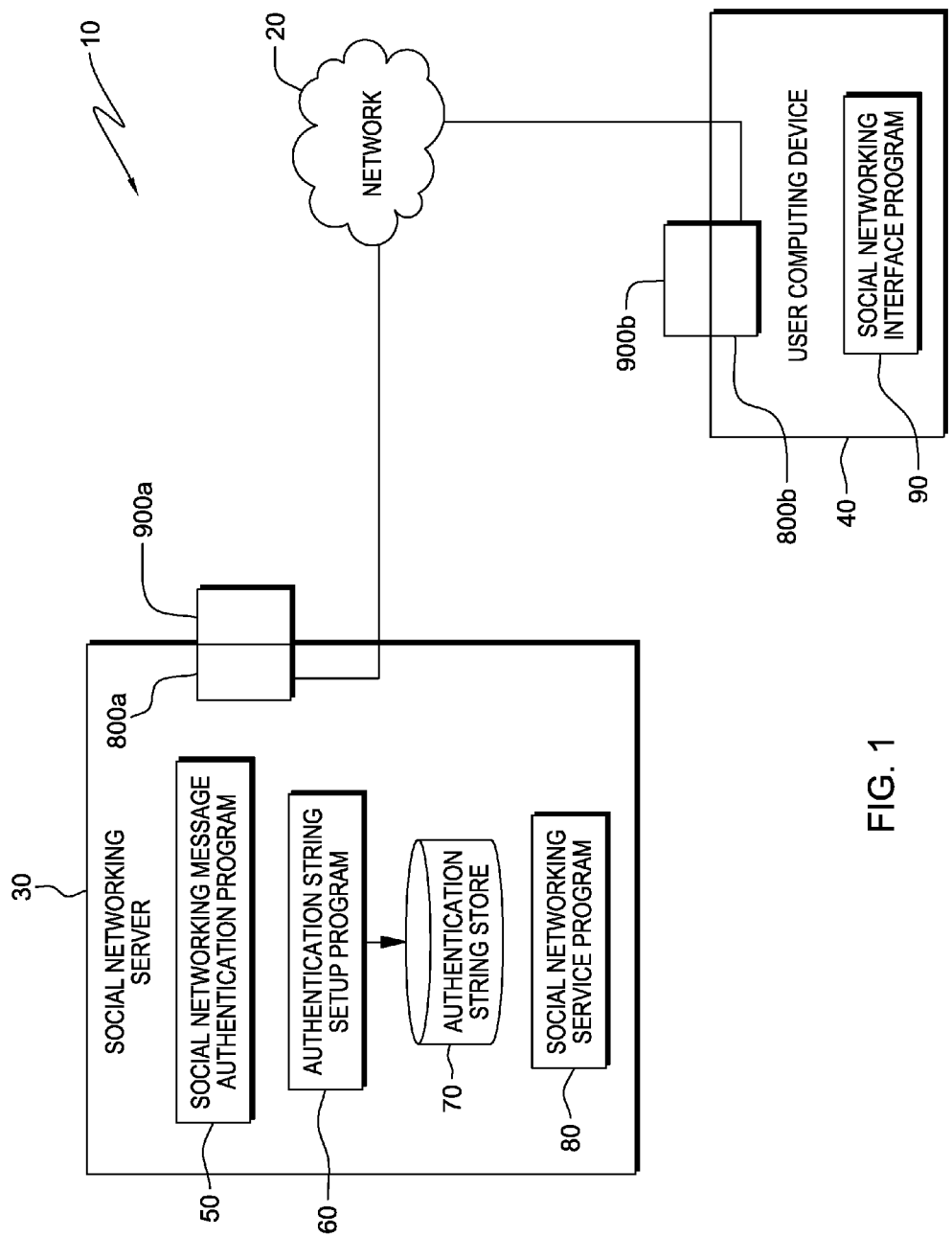
FIG. 1 depicts a diagram of a computing system in accordance with an embodiment of the present invention.

FIG. 1 depicts a diagram of a computing system 10 in accordance with an embodiment of the present invention. FIG. 1 provides only an illustration of one embodiment and does not imply any limitations with regard to the environments in which different embodiments may be implemented.

In the depicted embodiment, system 10 includes user computing device 40 and social networking server 30 interconnected over network 20. Network 20 may be a local area network (LAN), a wide area network (WAN) such as the Internet, a combination of the two or any combination of connections and protocols that will support communications between user computing device 40 and social networking server 30 in accordance with embodiments of the invention. Network 20 may include wired, wireless, or fiber optic connections.

User computing device 40 may be a laptop computer, tablet computer, desktop computer, personal digital assistant (PDA), or smart phone. In general, user computing device 40 may be any electronic device or computing system capable of accepting user input and communicating over a network with a social networking service. User computing device 40 contains social networking interface program 90 which is similar to a prior art social networking interface program except that social networking interface program 90 sends user messages to social networking message authentication program 50 instead of directly to the social networking service web site. This allows social networking message authentication program 50 to verify the authenticity of the message author based on authentication information entered in the message text field before forwarding the actual message text to the social networking service web site. User computing device 40 also contains internal components 800b and external components 900b.

In a preferred embodiment, social networking interface program 90 is a known web browser. The web browser is capable of displaying on user computing device 40 a web page, from a social networking service, with a known form having a message input field. For example, the form can be that provided by the known Facebook social messaging service. The web browser displays web pages received over the network from specific network addresses referred to as uniform resource locators (URLs). The web pages are authored primarily in hypertext markup language (HTML), which supports the display of forms with input fields. In other embodiments, social networking interface program 90 may be an application on a smart phone or any other program that is capable of accepting user input, displaying information and communicating over a network with a social networking service.

Social networking server 30 may be a server computer such as a management server, a web server, or any other electronic device capable of receiving and sending data. In another embodiment, social networking server 30 may represent a server computing system utilizing multiple computers as a server system, such as in a cloud computing environment. Social networking server 30 contains social networking message authentication program 50, authentication string setup program 60 with associated authentication string store 70, and social networking service program 80. Social networking server 30 also includes internal components 800a and external components 900a.

In a preferred embodiment, authentication string store 70 is a file that may be written by authentication string setup program 60 and read by social networking message authentication program 50. Authentication string store 70 operates to store a user's authentication string received from authentication string setup program 60. In another embodiment, authentication string store 70 may be a database such as Oracle® database or IBM® DB2® database.

In a preferred embodiment, authentication string store 70 resides on social networking server 30. In another embodiment, authentication string store 70 may reside on another server or another computing device provided it is accessible to social networking message authentication program 50 and authentication string setup program 60.

Social networking message authentication program 50 operates to verify that a string in a social networking message received, over network 20 from social networking service program 80, contains the authentication string of a user the social networking message is purported to be from. Social networking message authentication program 50 removes the string and passes the social networking message to social networking service program 80 to post to a "location" on the social networking service if the string contains the proper authentication string. In various embodiments a location may be a user's Facebook wall or a user's Twitter account.

In a preferred embodiment, social networking message authentication program 50 is a program residing on social networking server 30. In another embodiment, social networking message authentication program 50 may reside on another server or another computing device provided it is accessible to social networking service program 80 and has access to authentication string store 70.

In a preferred embodiment, social networking message authentication program 50 receives from social networking service program 80 a social networking message that includes a string used to determine if the social networking message was sent by the user who purportedly sent it. Social networking message authentication program 50 verifies that the string included in the social networking message contains the authentication string previously registered by the user and stored on authentication string store 70. If the authentication string is verified, social networking message authentication program 50 then removes the string from the social networking message and sends the social networking message to social networking service program 80 to be posted to a location on the social networking service. If the authentication string contained in the message does not match the authentication string previously registered by the user or if the message does not include any authentication string, then social networking message authentication program 50 blocks the message so it is not sent to social networking service program 80 and not posted on a social networking site.

In other embodiments, social networking message authentication program 50 may receive a social networking message over network 20 directly from social networking interface program 90 on user computing device 40. Social networking message authentication program 50 then follows the same process outlined in the paragraph above.

Social networking service program 80 operates as the main social networking program, such as Facebook social networking service or Twitter social networking service, to receive social networking messages from social networking interface program 90 on user computing device 40 and to send those messages to social networking message authentication program 50. Social networking service program 80 also posts social networking messages social networking service program 80 receives from social networking message authentication program 50 to a location on the social networking service. In a preferred embodiment, social networking service program 80 is a program residing on social networking server 30. In another embodiment, social networking service program 80 may reside on another server or another computing device, provided social networking service program 80 is accessible to social networking interface program 90 and social networking message authentication program 50.

Authentication string setup program 60 operates to allow a user to define an authentication string for use by social networking message authentication program 50. In a preferred embodiment, authentication string setup program 60 is a web based program residing on social networking server 30. In general, authentication string setup program 60 may reside on another network server, on user computing device 40, or on any computing device, provided it is can communicate with user computing device 40, and authentication string store 70 where the authentication string is stored.

In a preferred embodiment, authentication string setup program 60 receives an initial authentication string from user computing device 40 over network 20 and stores the authentication string on authentication string store 70.

In various embodiments, authentication string setup program 60 may permit a user to setup multiple authentication strings. For example, one authentication string may be used for a desktop computer and another for a smart phone. Also, different authentication strings can be used for different social networking services. These computing devices are capable of utilizing different types of authentication strings as illustrated below in the description of FIG. 3, FIG. 4 and FIG. 5.

Authentication string setup program 60 also operates to allow a user to edit a previously stored authentication string. Authentication string setup program 60 receives the edited authentication string from user computing device 40 over network 20 and stores the authentication string on authentication string store 70.

Figure 2:
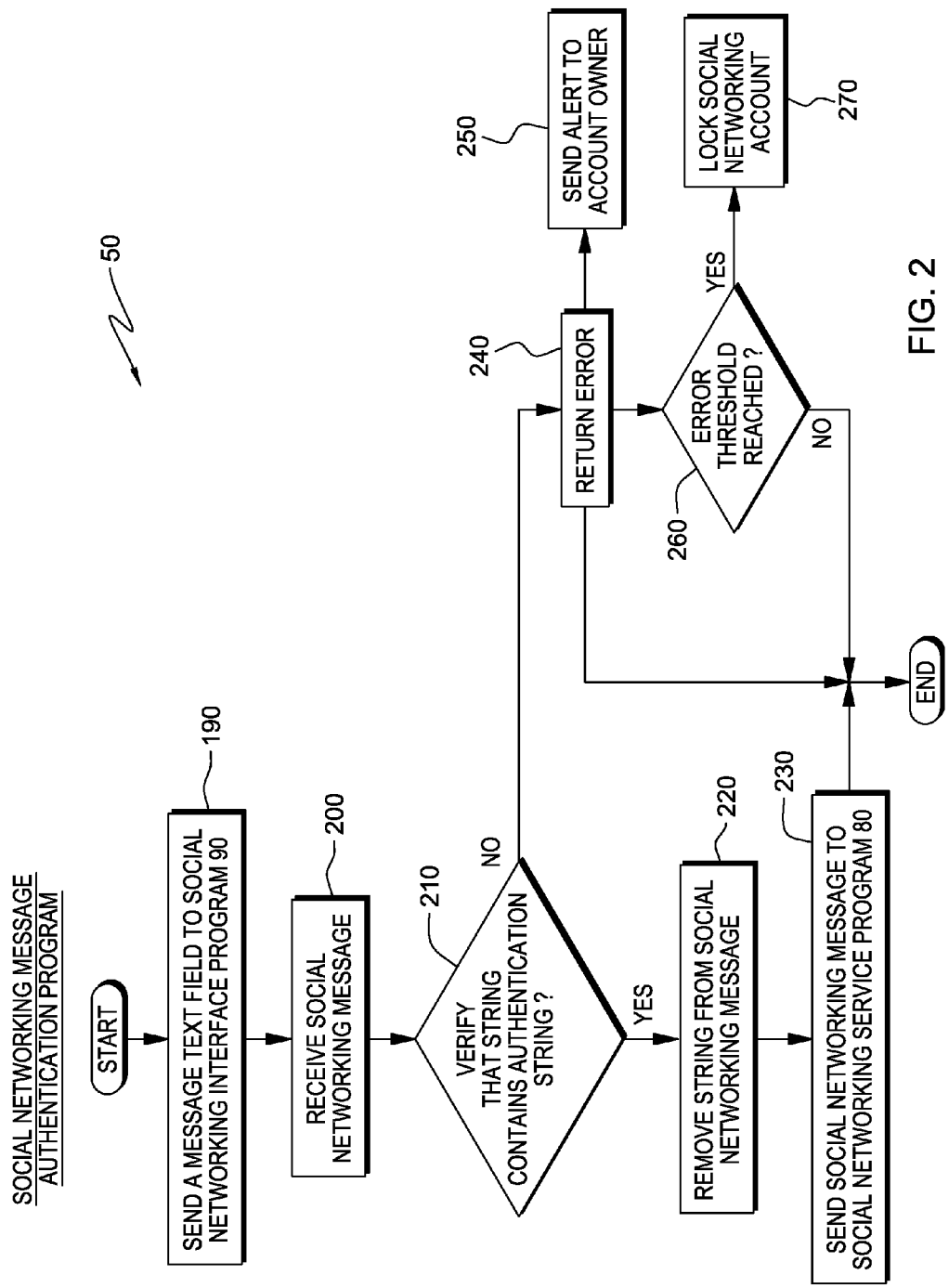
FIG. 2 depicts a flowchart of the steps of a social networking message authentication program executing within the computing system of FIG. 1, for verifying that a string in a social networking message contains the authentication string of a user, in accordance with a preferred embodiment of the present invention.

FIG. 2 depicts a flowchart of the steps of social networking message authentication program 50 for verifying that a string in a social networking message contains the authentication string of a user, in accordance with a preferred embodiment of the present invention.

Social networking interface program 90 sends the social networking message with a string from user computing device 40 over network 20 to social networking service program 80 on social networking server 30.

In a preferred embodiment, the string has two portions and is located in the body of the social networking message in the message text field. Thus, the authentication string is entered into the same field as the actual message text. The first portion is a predetermined combination of alpha numeric characters that indicates that the following characters are the second portion which contains the authentication sting.

In an alternative embodiment, social networking interface program 90 accesses data from biometric data sensors of user computing device 40 and inserts the data in to the social networking message as a string. User computing device 40 is an electronic device including one or more sensors such as an accelerometer or a gyroscope, and social networking interface program 90 is an application on user computing device 40. Social networking interface program 90 calls an Application Programming Interface (API) or a Standard Development Kit (SDK) of user computing device 40 to begin updating sensor data from the sensors of user computing device 40, and social networking interface program 90 prompts the user to make a series of motions or actions that would utilize the sensors of user computing device 40. Social networking interface program 90 calls the API or the SDK of user computing device 40 to access the sensor data collected while the user makes the series of motions or actions with user computing device 40. Social networking interface program 90 calls the API or the SDK or user computing device 40 to stop updating sensor data.

In step 190, social networking message authentication program 50 sends to social networking interface program 90 a message text field to display for a social networking service in response to a user accessing the social networking service web site and supplying a known userID and password to the social networking service. In response, the user enters into the message text field, actual message text and the symbol indicative of the authentication string, followed by the authentication string.

In step 200, social networking message authentication program 50 receives the social networking message with the string from social networking service program 80.

In step 210, social networking message authentication program 50 identifies the authentication string from the predetermined keyboard symbol and verifies that the string in the social networking message contains the authentication string previously registered by the user and stored on authentication string store 70. In a preferred embodiment, social networking message authentication program 50 queries authentication string store 70, to fetch the registered authentication string of the user and compares the registered authentication string to the second portion of the string included in the social networking message. The form of the query matches the form of the authentication string store 70, i.e., relational or non-relational.

If social networking message authentication program 50 verifies that the string in the social networking message contains the authentication string defined by the user and stored on authentication string store 70 (decision 210, yes branch), then social networking message authentication program 50 removes the string from the social networking message (step 220) and sends the social networking message to social networking service program 80 to be posted to a location on the social networking service (step 230).

If social networking message authentication program 50 cannot verify that the social networking message contains the authentication string defined by the user and stored on authentication string store 70 (i.e., either the message text field contains no authentication string or contains an authentication string that does not match the registered authentication string for the user) (decision 210, no branch), then social networking message authentication program 50 will return an error to the sender of the second message and not forward the message to the social networking service (step 240).

If activated by an owner of the social networking account to which the message was intended to be sent, social networking message authentication program 50 sends an alert to the owner of the social networking account when an error is returned to the sender of the second message, as follows (step 250). Social networking message authentication program 50 calls social networking service program 80 to obtain contact preferences set by the owner and sends the owner an alert using the contact preferences. The alert may be sent to an electronic device of the owner of the social networking account. The alert may be sent by email or text message depending on the preferences setup by the owner of the social networking account.

If activated by the owner of the social networking account, social networking message authentication program 50 will lock the social networking account in response to social networking message authentication program 50 receiving a predetermined threshold number of social networking messages that identify the social networking account and are devoid of a string that contains the proper authentication string. The owner will select the number of messages devoid of a string that contains the authentication string needed to lock the social networking account.

In a preferred embodiment, after returning an error to the sender of the second message, social networking message authentication program 50 determines if the number of messages devoid of a string that contains the authentication string needed to lock the social networking account has been reached (step 260). If the number has not been reached then social networking message authentication program 50 ends. If the number has been reached social networking message authentication program 50 locks the social networking account (step 270).

Figure 3:
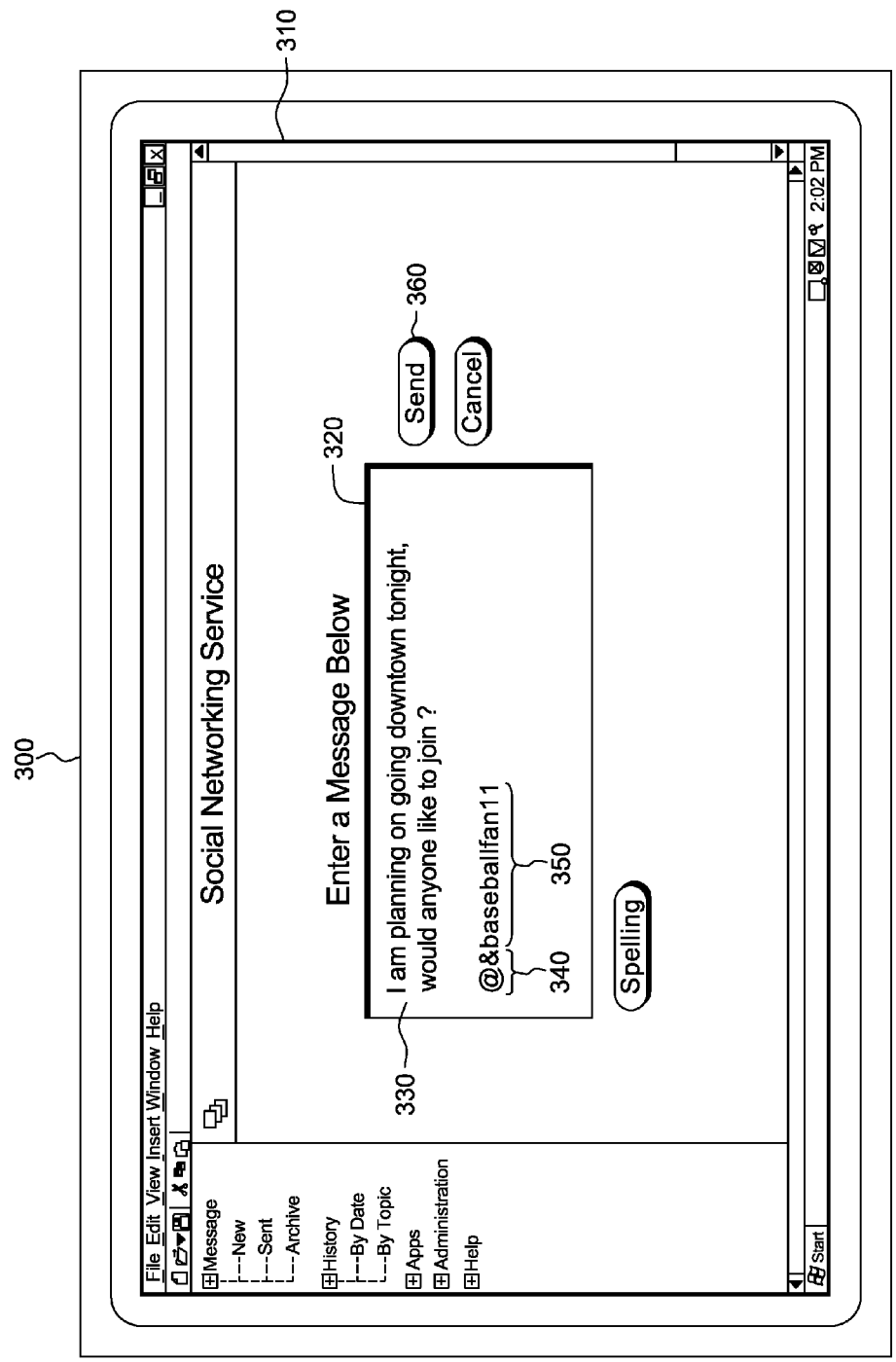
FIG. 3 is an exemplary interface to a social networking service program.

FIG. 3 is an exemplary interface to a social networking service. User interface 300 displays a social networking web site 310. Social networking web site 310 includes a message text field 320 where a user may enter message text 330. The user may also enter a string in the message text field 320. A string has two portions and is entered into the same field as the actual message text. A first portion 340 is a predetermined combination of alpha numeric characters (e.g., @&) that indicates that the following characters are a second portion 350 (e.g., baseballfan11) which contains the authentication sting. After the user has entered the message text 330, the first portion 340, and the second portion 350, the user will select the send button 360.

FIG. 4 depicts a flowchart of the steps of authentication string setup program 60 for defining, establishing and storing an authentication string, in accordance with a preferred embodiment of the present invention.

Access to authentication string setup program 60 is granted after a user logs on to a social networking service. In a preferred embodiment, a userID and password are required to logon to the social networking service. In another embodiment, after initial access to authentication string setup program 60 is granted, an additional layer of security may be used. For example, the additional layer of security may be a security question or any other security function in addition to the userID and password login.

In step 400, authentication string setup program 60 receives a request to establish a new authentication string from social networking interface program 90. In a preferred embodiment, social networking interface program 90 sends the request when a user selects the authentication string setup URL while viewing the settings or preferences web page of a particular service.

In response to the authentication string setup request, authentication string setup program 60 sends to social networking interface program 90 a web page with at least a form having an authentication string input field (step 410).

Authentication string setup program 60 receives the new authentication string from social networking interface program 90 (step 420). In a preferred embodiment, the authentication string is a set of characters.

Authentication string setup program 60 stores the authentication string on authentication string store 70 (step 430) so social networking message authentication program 50 may access the stored string when carrying out step 210.

FIG. 5 depicts a flowchart of the steps of authentication string setup program 60 for defining, establishing and storing an authentication string, in accordance with other embodiments of the present invention. In the embodiment of FIG. 5, user computing device 40 is an electronic device including one or more biometric data sensors such as an accelerometer or a gyroscope, and social networking interface program 90 is an application on user computing device 40.

In step 500, authentication string setup program 60 receives a request to establish a new authentication string from social networking interface program 90. Social networking interface program 90 sends to authentication string setup program 60 the request, in response to a user selecting the authentication string setup function in the application on user computing device 40.

In response to receiving the authentication string setup request, authentication string setup program 60 sends to social networking interface program 90 a request for the user to input a new authentication string (step 510).

Authentication string setup program 60 receives from social networking interface program 90 the sensor data from the biometric data sensors of user computing device 40 (step 520).

Authentication string setup program 60 stores the sensor data from the biometric data sensors of user computing device 40 as the new authentication string on authentication string store 70 (step 530) so social networking message authentication program 50 may access the stored strings when carrying out step 210.

Figure 6:
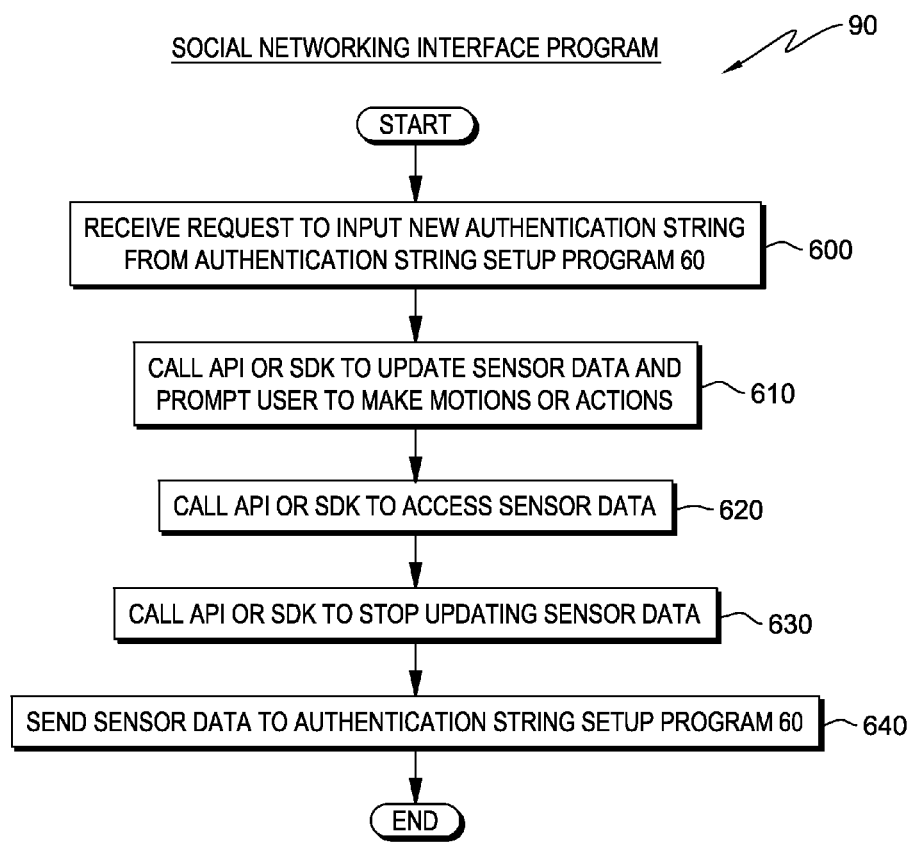
FIG. 6 depicts a flowchart of the steps of a social networking interface program for updating and collecting sensor data for use with the authentication string setup program of FIG. 4 or 5, in accordance with other embodiments of the present invention.

FIG. 6 depicts a flowchart of the steps of social networking interface program 90 for updating and collecting sensor data for use with authentication string setup program 60, in accordance with other embodiments of the present invention. In the embodiment of FIG. 6, user computing device 40 is an electronic device including one or more biometric data sensors such as an accelerometer or a gyroscope, and social networking interface program 90 is an application on user computing device 40.

Social networking interface program 90 receives a request from authentication string setup program 60 for the user to input a new authentication string (step 600).

Social networking interface program 90 calls an Application Programming Interface (API) or a Standard Development Kit (SDK) of user computing device 40 to begin updating sensor data from the biometric data sensors of user computing device 40, and social networking interface program 90 prompts the user to make a series of motions or actions that would utilize the biometric data sensors of user computing device 40 (step 610). In one embodiment, user computing device 40 is an Apple® iPhone® device and user computing device 40 includes a Core Motion API and an accelerometer and a gyroscope. Social networking interface program 90 calls the Core Motion API to start updating data from the accelerometer and the gyroscope. In another embodiment, user computing device 40 is a Droid™ X device (DROID is a trademark of Lucasfilm Ltd. and its related companies) and user computing device 40 includes an Android™ API and a touch screen sensor. Social networking interface program 90 calls the Android API to start updating data from the touch screen sensor.

Social networking interface program 90 calls the API or the SDK of user computing device 40 to access the sensor data collected while the user makes the series of motions or actions with user computing device 40 (step 620). Social networking interface program 90 calls the API or the SDK or user computing device 40 to stop updating sensor data (step 630). Social networking interface program 90 sends the sensor data from the biometric data sensors of user computing device 40, collected while the user made the series of motions or actions, to authentication string setup program 60 (step 640). In one embodiment, user computing device 40 is an Apple® iPhone® and user computing device 40 includes a Core Motion API and an accelerometer and a gyroscope. Social networking interface program 90 calls the Core Motion API to access the accelerometer and the gyroscope data collected while the user makes a series of motions with user computing device 40. In another embodiment, user computing device 40 is a Droid™ X (DROID is a trademark of Lucasfilm Ltd. and its related companies) and user computing device 40 includes an Android™ API and a touch screen sensor. Social networking interface program 90 calls the Android API to access the touch screen sensor data collected while the user makes a series of motions on the touch screen of user computing device 40.

Figure 7:
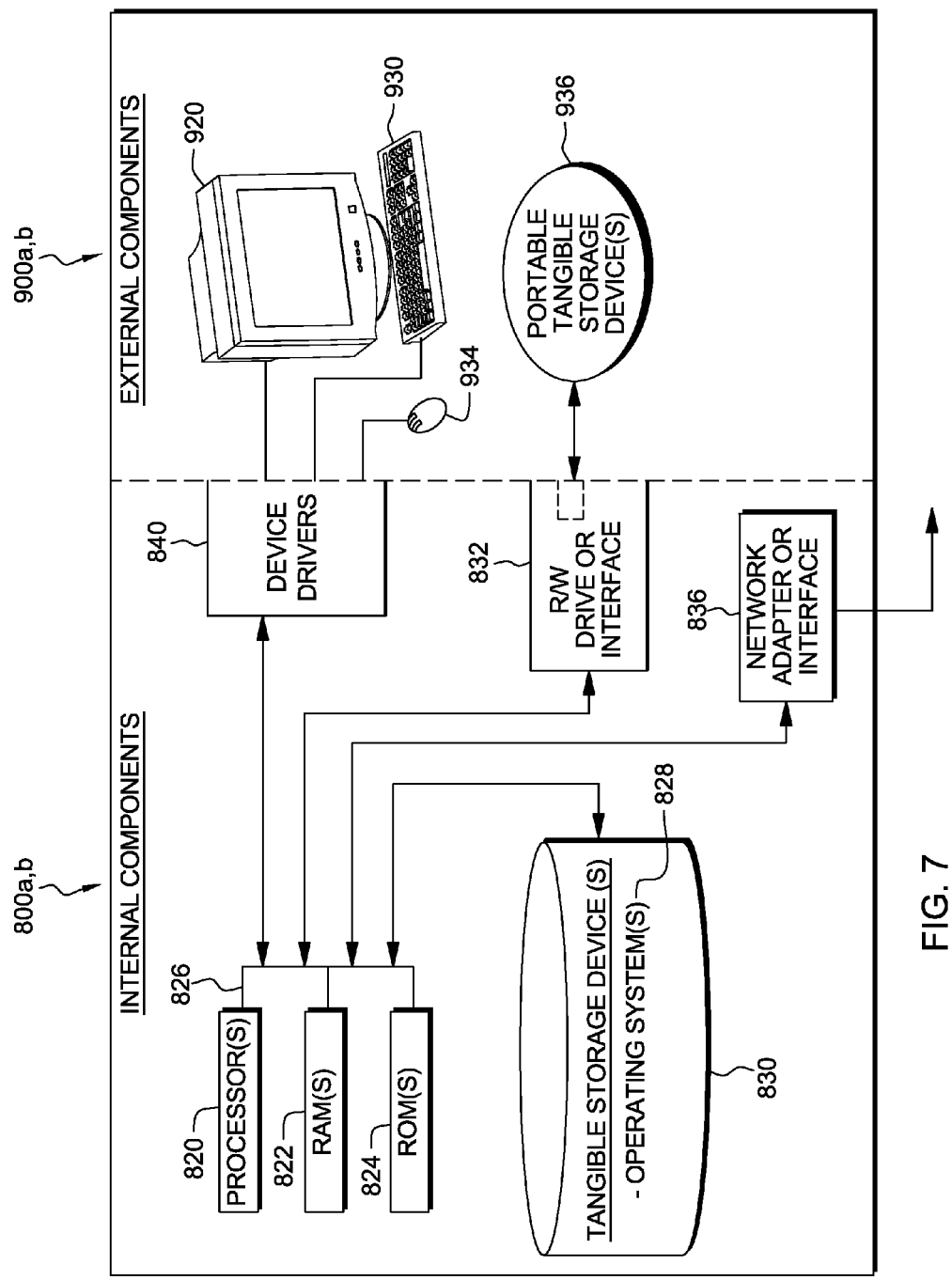
FIG. 7 is a block diagram of internal and external components of the computers of FIG. 1.

FIG. 7 is a block diagram of internal and external components of the computers of FIG. 1 in accordance with an embodiment of the present invention.

User computing device 40 and social networking server 30 include respective sets of internal components 800a,b and external components 900a,b illustrated in FIG. 7. Each of the sets of internal components 800a,b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, social networking message authentication program 50 (for social networking server 30), authentication string setup program 60 (for social networking server 30), social networking service program 80 (for social networking server 30) and any other programs for social networking server 30 and user computing device 40 are stored on one or more of the respective computer-readable tangible storage devices 830 for execution by one or more of the respective processors 820 via one or more of the respective RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Social networking message authentication program 50 (for social networking server 30), authentication string setup program 60 (for social networking server 30), social networking service program 80 (for social networking server 30) and any other programs for social networking server 30 and user computing device 40 can be stored on one or more of the respective portable computer-readable tangible storage devices 936, read via the respective R/W drive or interface 832 and loaded into the respective hard drive 83.

Each set of internal components 800a,b also includes a network adapter or interface 836 such as a TCP/IP adapter card. Social networking message authentication program 50 (for social networking server 30), authentication string setup program 60 (for social networking server 30), social networking service program 80 (for social networking server 30) and any other programs for social networking server 30 and user computing device 40 can be downloaded to the respective computers from an external computer via a network (such as network 20) and network adapter or interface 836. From the network adapter or interface 836, social networking message authentication program 50 (for social networking server 30), authentication string setup program 60 (for social networking server 30), social networking service program 80 (for social networking server 30) and any other programs for social networking server 30 and user computing device 40 are loaded into the respective hard drive 830. The network may comprise copper wires, optical fibers, wireless transmission, routers, firewalls, switches, gateway computers and/or edge servers.

Each of the sets of external components 900a,b includes a computer display monitor 920, a keyboard 930, and a computer mouse 934. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Social networking message authentication program 50 (for social networking server 30), authentication string setup program 60 (for social networking server 30), social networking service program 80 (for social networking server 30) and any other programs for social networking server 30 and user computing device 40 can be written in various programming languages (such as Java, C++) including low-level, high-level, object-oriented or non object-oriented languages. Alternatively, the functions of social networking message authentication program 50 (for social networking server 30), authentication string setup program 60 (for social networking server 30), social networking service program 80 (for social networking server 30) and any other programs for social networking server 30 and user computing device 40 can be implemented in whole or in part by computer circuits and other hardware (not shown).

Based on the foregoing, a computer system, method and program product have been disclosed for verifying that a message received by a social networking service was sent by a bona fide owner of a social networking account who purportedly sent the message. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for verifying that a message received by a social networking service was sent by a bona fide owner of a social networking account who purportedly sent the message, the method comprising the steps of:
   a network server computer receiving the message and locating in the message a string that was entered into a message text field of the message by a person who authored the message, the string comprising first and second portions, the first portion comprising a combination of alpha numeric characters which identifies the second portion as containing purported authentication information for the bona fide owner of the account;

the network server computer comparing the second portion of the string in the message to a registered authentication string for the bona fide owner of the account; and the network server computer determining that the second portion of the string in the message matches the registered authentication string, and responsive to the determining, the network server computer removing the string from the message and, after removing the string, posting the message to the social networking service.

2. The method of claim 1, further comprising the steps of:
the network server computer receiving a second message identifying the social networking account; and
the network server computer determining that the second message does not include the authentication string, and in response, the network server computer returning an error to a sender of the second message.

3. The method of claim 2, wherein in response to the network server computer determining that the second message does not include the authentication string further comprising the step of the networking server computer sending a message to an electronic device of the owner alerting the owner of the second message.

4. The method of claim 1, further comprising the step of the network server computer setting a lock on the social networking account in response to the network server computer receiving a number of messages that identify the social networking account and are devoid of a string that matches the authentication string.

5. A computer program product for verifying that a message received by a social networking service was sent by a bona fide owner of a social networking account who purportedly sent the message, the computer program product comprising:
one or more computer-readable tangible storage devices and program instructions stored on at least one of the one or more storage devices, the program instructions comprising;
program instructions to receive the message and locate in the message a string that was entered into a message text field of the message by a person who authored the message, the string comprising first and second portions, the first portion comprising a combination of alpha numeric characters which identifies the second portion as containing purported authentication information for the bona fide owner of the account;
program instructions to compare the second portion of the string in the message to a registered authentication string for the bona fide owner of the account; and
program instructions to determine that the second portion of the string in the message matches the registered authentication string, program instructions to remove the string from the message and, after removing the string, program instructions to post the message to the social networking service; and
program instructions to determine that the second portion of the string in the message does not match the registered authentication string, program instructions to block the message from being forwarded to the social networking service.

6. The computer program product of claim 5, further comprising program instructions, stored on at least one of the one or more storage devices, to:
receive a second message identifying the social networking account; and
determine that the second message does not include the authentication string, and in response, to return an error to a sender of the second message.

7. The computer program product of claim 6, further comprising program instructions, stored on at least one of the one or more storage devices, to send a message to an electronic device of the owner alerting the owner of the second message, in response to the second message not including the authentication string.

8. The computer program product of claim 5, further comprising program instructions, stored on at least one of the one or more storage devices, to receive a number of messages that identify the social networking account and are devoid of a string that matches the authentication string, and in response, set a lock on the social networking account.

9. A computer system for verifying that a message received by a social networking service was sent by a bona fide owner of a social networking account who purportedly sent the message, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive the message and locate in the message a string that was entered into a message text field of the message by a person who authored the message, the string comprising first and second portions, the first portion comprising a combination of alpha numeric characters which identifies the second portion as containing purported authentication information for the bona fide owner of the account;
program instructions to compare the second portion of the string in the message to a registered authentication string for the bona fide owner of the account; and
program instructions to determine that the second portion of the string in the message matches the registered authentication string, program instructions to remove the string from the message and, after removing the string, program instructions to post the message to the social networking service; and
program instructions to determine that the second portion of the string in the message does not match the registered authentication string, program instructions to block the message from being forwarded to the social networking service.

10. The computer system of claim 9, further comprising program instructions, stored on at least one of the one or more storage devices for execution by at least one of the one or more processors via at least one of the one or more memories, to:
receive a second message identifying the social networking account; and
determine that the second message does not include the authentication string, and in response, to return an error to a sender of the second message.

11. The computer system of claim 10, further comprising program instructions, stored on at least one of the one or more storage devices for execution by at least one of the one or more processors via at least one of the one or more memories, to send a message to an electronic device of the owner alerting the owner of the second message, in response to the second message not including the authentication string.

12. The computer system of claim 9, further comprising program instructions, stored on at least one of the one or more storage devices for execution by at least one of the one or more processors via at least one of the one or more memories, to receive a number of messages that identify the social networking account and are devoid of a string that matches the authentication string, and in response, set a lock on the social networking account.

* * * * *